US010229186B1

(12) United States Patent
Reiner et al.

(10) Patent No.: US 10,229,186 B1
(45) Date of Patent: Mar. 12, 2019

(54) DATA SET DISCOVERY ENGINE COMPRISING RELATIVISTIC RETRIEVER

(71) Applicant: EMC Corporation, Hopkinton, MA (US)

(72) Inventors: David Stephen Reiner, Lexington, MA (US); Nihar Nanda, Acton, MA (US); Leonid Levkovich-Maslyuk, Moscow (RU); Andrey Abramov, Moscow (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 454 days.

(21) Appl. No.: 15/074,597

(22) Filed: Mar. 18, 2016

(51) Int. Cl.
*G06F 17/30* (2006.01)

(52) U.S. Cl.
CPC .. *G06F 17/30622* (2013.01); *G06F 17/30675* (2013.01)

(58) Field of Classification Search
None
See application file for complete search history.

(56) References Cited

U.S. PATENT DOCUMENTS

| | | | |
|---|---|---|---|
| 7,542,969 B1 * | 6/2009 | Rappaport | G06F 17/30672 |
| 8,838,556 B1 | 9/2014 | Reiner et al. | |
| 9,141,908 B1 | 9/2015 | Reiner et al. | |
| 2012/0245925 A1 * | 9/2012 | Guha | G06F 17/27 |
| | | | 704/9 |
| 2014/0358940 A1 * | 12/2014 | Gupta | G06F 17/30389 |
| | | | 707/748 |
| 2015/0186931 A1 * | 7/2015 | Flake | G06Q 30/0247 |
| | | | 705/14.46 |
| 2015/0227588 A1 * | 8/2015 | Shapira | G06F 17/30675 |
| | | | 707/722 |

OTHER PUBLICATIONS

U.S. Appl. No. 14/487,520 filed in the name of Nihar Nanda et al. Sep. 16, 2014 and entitled "Data Set Virtual Neighborhood Characterization, Provisioning and Access."
E.J. Richardson et al., "Meta4: A Web Application for Sharing and Annotating Metagenomic Gene Predictions Using Web Services," Frontiers in Genetics, Methods Article, Sep. 5, 2013, pp. 1-6, vol. 4, Article 168.

* cited by examiner

*Primary Examiner* — Richard L Bowen
(74) *Attorney, Agent, or Firm* — Ryan, Mason & Lewis, LLP

(57) ABSTRACT

An apparatus in one embodiment comprises a processing platform implementing a data set discovery engine. The data set discovery engine comprises a data set indexer configured to generate similarity indexes for a plurality of data sets, and a relativistic retriever coupled to the data set indexer and configured to obtain a suitability template for a query and to execute the query against one or more of the similarity indexes based at least in part on the suitability template. A given one of the similarity indexes comprises at least first and second auxiliary information generated from respective ones of at least first and second different similarity measures of a plurality of different similarity measures. The first and second similarity measures comprise selected ones of the plurality of different similarity measures that are supported by the data set discovery engine with the supported similarity measures comprising both frequency-based and non-frequency-based similarity measures.

20 Claims, 8 Drawing Sheets

$$J(DOC, QUERY) = \frac{|DOC \cap QUERY|}{|DOC \cup QUERY|}$$

DATA SET DISCOVERY ENGINE COMPRISING RELATIVISTIC RETRIEVER

FIELD

The field relates generally to information processing systems, and more particularly to processing of data sets in information processing systems.

BACKGROUND

Conventional techniques for information processing include document-oriented data processing tools such as Lucene. Other types of data processing tools are configured to utilize Java-based graph databases. However, these and other conventional tools are unduly limited in terms of the similarity measures that can be supported. For example, in some cases, such tools are restricted to use with particular frequency-based similarity measures. Moreover, these and other conventional tools fail to support queries around, for example, suitability of data for particular purposes, goals, or analytic roles.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

It should also be noted that illustrative embodiments of the invention can include, without limitation, apparatus, systems, methods, and computer program products comprising processor-readable storage media.

Figure 1:
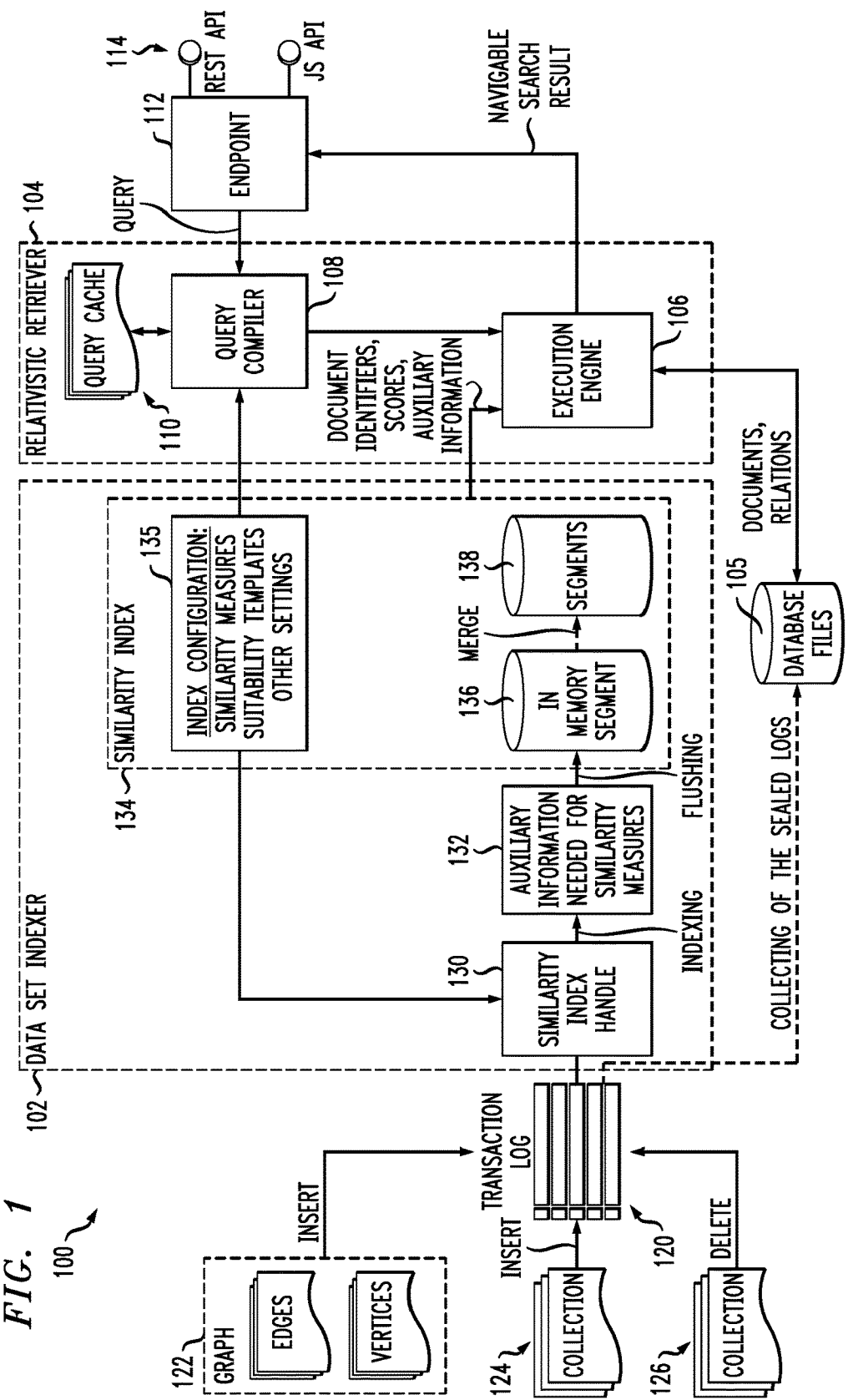
FIG. 1 is a block diagram of an information processing system comprising a data set discovery engine that includes a data set indexer and a relativistic retriever in an illustrative embodiment of the invention.

FIG. 1 shows an information processing system 100 configured in accordance with an illustrative embodiment of the present invention. The information processing system 100 is assumed to be built on at least one processing platform and provides functionality for data set discovery. In this embodiment, the system 100 more particularly comprises a data set discovery engine that includes a data set indexer 102 coupled to a relativistic retriever 104. The relativistic retriever 104 is configured to access a database 105 that stores database files.

Although the data set indexer 102 in the present embodiment is illustrated in the figure as not having access to the database 105, this arrangement may be altered in other embodiments to provide each of the data set indexer 102 and the relativistic retriever 104 with access to at least portions of the database 105.

The database 105 is illustratively implemented in the form of a multi-model database configured to store a variety of distinct collections of data sets, metadata structures and graphs of relationships, although numerous other types of information can additionally or alternatively be stored. Such information can illustratively be configured in accordance with a property graph data model or other type of model. In some embodiments, the multi-model database utilizes embedded inverted indexing for storing collections of data sets of different types and information characterizing relationships among the data sets. The database 105 in some embodiments is implemented at least in part utilizing an in-memory database, although a wide variety of other database configurations can be used.

The data set indexer 102 is configured to generate similarity indexes for a plurality of data sets, and the relativistic retriever 104 is configured to obtain a suitability template for a query and to execute the query against one or more of the similarity indexes based at least in part on the suitability template. A given one of the similarity indexes in this embodiment is assumed to comprise at least first and second auxiliary information generated from respective ones of at least first and second different similarity measures of a plurality of different similarity measures supported by the data set discovery engine of system 100.

As will be described in more detail below, the relativistic retriever 104 utilizes similarity indexes and associated relationships among data sets, as well as higher-order relationships including relationships among data set relationships, in order to discover suitable data sets responsive to a query, and to support recommendation, navigation and other functionality relating to those data sets.

It should be noted in this regard that terms such as "retriever," "retrieve" and "retrieval" as used herein are intended to be broadly construed, and should not be viewed as requiring actual reading of a data set from a memory or other storage device. For example, in some embodiments, information characterizing one or more discovered data sets is provided by the relativistic retriever 104 responsive to a query. Such information can include a pointer to a given data set, or other types of information sufficient to allow the data set itself to be read from a memory or other storage device, or otherwise obtained by a system entity that requires access to that data set. It is possible that such information in some cases may include the given data set itself, or one or more designated portions of the given data set. Accordingly, references herein to retrieval or retrieving of data sets by one system entity should be understood to encompass arrangements in which, for example, that entity provides information sufficient to allow another system entity to perform actual reading of the data set from a memory or other storage device.

The relativistic retriever 104 in this embodiment comprises an execution engine 106, a query compiler 108, and a query cache 110. The query compiler 108 receives a query from an endpoint device 112, or retrieves a previously-submitted query from the query cache 110, and utilizes a suitability template for the query to compile the query for execution by the execution engine 106.

The endpoint device 112 in this embodiment is accessible via multiple application programming interfaces (APIs) 114, including a Representational State Transfer (REST) API and a JavaScript (JS) API. Other types and configurations of endpoint devices and APIs can be used in other embodiments.

The execution engine 106 interacts with the data set indexer 102 to obtain information such as document identifiers, scores and auxiliary information. The execution engine 106 obtains additional information in the form of documents and relations from the database files of the database 105.

The execution engine 106 utilizes the obtained information in executing the compiled query provided by the query compiler 108. A corresponding navigable search result is provided back to the endpoint device 112.

The data set indexer 102 and relativistic retriever 104 collectively support a broad range of queries, including queries in various federated settings possibly involving numerous distinct data set collections and other related information. Such queries are processed using not only data set content and identified relationships among the data sets, but also address additional relationships among the identified relationships, thereby providing significant enhancements in data set discovery functionality.

Although not explicitly shown in the figure, a graphical user interface (GUI) may be associated with the endpoint device 112 so as to support user submission of queries as well as user interaction with corresponding navigable search results.

The navigable search results are based at least in part on relationships between data sets as determined using similarity indexes provided by the data set indexer 102. In this embodiment, the data set indexer 102 operates on information compiled in a transaction log 120. The information compiled in the transaction log 120 relates to data sets that include information from at least one graph 122 comprising edges and vertices. Other data sets comprise information from collections 124 and 126 of different data items.

The sealed logs of the transaction log 120 are provided to the database 105 and to the data set indexer 102 for use in generating a similarity index handle 130. The similarity index handle 130 provides an entry point to a similarity index. Although sealed logs are used in this embodiment, other embodiments can use other types of logs or transaction information. Indexing operations result in auxiliary information 132 for particular similarity measures, which is provided to a similarity index component 134. A given index configuration 135 of the data set indexer 102 in this embodiment illustratively comprises similarity measures, suitability templates and other settings, although other types of index configurations can be used. The similarity index component 134 flushes the auxiliary information 132 to an in-memory segment 136, which is subsequently merged with other segments 138. For example, in some embodiments, there is an in-memory segment associated with each transaction log, and in conjunction with sealing of a given transaction log, the corresponding in-memory segment is merged into one or more persistent segments for storage.

The data set discovery engine comprising data set indexer 102 and relativistic retriever 104 is particularly well-suited for processing graphs, data collections or other data sets comprising very large numbers of data items. Such data sets often contain substantial amounts of potentially actionable information that is not captured or effectively utilized by existing tools. This information illustratively includes metadata on data sets, content in data sets, explicit and implicit relationships among data sets, and rich descriptions of these relationships. The data set discovery engine of system 100 incorporates a software architecture and methodology configured to support accurate, efficient and deep data set discovery based on such information, including in some embodiments recommendation of data sets, thereby facilitating the determination of particular data sets suitable for a given purpose, goal or analytic role.

For example, in some embodiments, the data set discovery engine of system 100 is capable of discovering, ranking and clustering data sets according to their similarity to a target specification or suitability for a given purpose, goal or analytic role. Its architecture allows the use of weighted, pluggable similarity measures, either universally or in a domain-specific fashion. It treats data sets and relationships among them in a unified manner, while providing a scalable infrastructure for automated reasoning and performance of high-level analytics processing over the discovered results.

As a more particular example, a given embodiment of the data set discovery engine of system 100 is configured to identify, from one or more graphs such as graph 122 and one or more collections such as collections 124 and 126, data sets similar to a given target data set, to discover relationships among the data sets, and possibly relationships among relationships, and to recommend data sets suitable for a given purpose, goal or analytic role. The discovered data sets are ranked by the degree of similarity to the target and this ranking is extended to suitability for the given purpose, goal, or role. Such an embodiment is further configured to support reasoning and analytics over the discovered results, treating data sets and relationships in a unified way, and to optimize, tune or otherwise adjust the similarity measures and their weightings based on user behavior in responding to recommendations. A wide variety of additional or alternative data set discovery functionality can be provided in other embodiments.

It is also to be appreciated that the particular arrangement of system components illustrated in FIG. 1 is exemplary only, and that numerous other arrangements of components may be used in other embodiments. For example, in other embodiments, functionality described herein as being associated with particular components of the system 100 may be implemented at least in part using additional or alternative components of the system 100.

As mentioned previously, the information processing system 100 is assumed in the present embodiment to be implemented on a given processing platform comprising one or more processing devices. Such a processing platform can comprise various combinations of physical and virtual resources. Illustrative examples of such processing platforms that may be used to implement at least portions of the system 100 will be described in more detail below in conjunction with FIGS. 11 and 12.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Moreover, the particular implementation of data set indexing and associated relativistic retrieval in the FIG. 1 embodiment is illustrative only, and can be varied in other embodiments.

Figure 2:
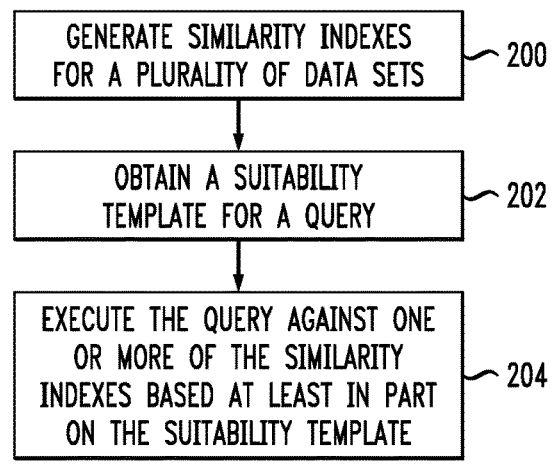
FIG. 2 is a flow diagram of an example process for data set discovery in an illustrative embodiment.

A flow diagram of an example process for data set discovery in the system 100 is illustrated in FIG. 2. This process is performed by cooperative interaction of the data set indexer 102 and the relativistic retriever 104, and includes steps 200, 202 and 204. A wide variety of additional or alternative processes can be used in other embodiments.

In step 200, similarity indexes are generated for a plurality of data sets. The data sets in this embodiment illustratively include information from graph 122 and collections 124 and 126. However, the term "data set" as used herein is intended to be more broadly construed. For example, a "data set" as the term is broadly used herein may be viewed, for example, as an abstraction of one or more data items, such as a table, document, file, query result, set of key-value pairs, index, storage block contents, in-memory caches or other data item or combinations thereof, where the given data set is characterized by properties as well as relationships to other data sets. These properties and relationships are captured by metadata that is associated with the data set in the system 100. For example, metadata can be used to describe data set characteristics such as ownership, type, content, schema, classification, matchable patterns, text analytics characterizations, security classifications, provenance, usability, quality, ad hoc user tags, and many others.

Additional details regarding exemplary data sets and metadata characterizing those data sets, as well as techniques for reasoning over such metadata and possibly also corresponding data set content, can be found in U.S. Pat. No. 8,838,556, entitled "Managing Data Sets by Reasoning over Captured Metadata," U.S. Pat. No. 9,141,908, entitled "Dynamic Information Assembly for Designated Purpose based on Suitability Reasoning over Metadata," and U.S. patent application Ser. No. 14/487,520, filed Sep. 16, 2014 and entitled "Data Set Virtual Neighborhood Characterization, Provisioning and Access," all of which are commonly assigned herewith and incorporated by reference herein. It is to be appreciated, however, that such data sets and reasoning techniques are considered examples only, and need not be utilized in other embodiments.

The similarity indexes referred to in step 200 illustratively comprise at least first and second auxiliary information generated from respective ones of at least first and second different similarity measures of a plurality of different similarity measures supported by the data set discovery engine of the system 100.

The data set discovery engine of system 100 supports a plurality of different similarity measures, including at least one frequency-based similarity measure and at least one non-frequency-based similarity measure. In some embodiments, an arbitrary set of two or more similarity measures selected from the plurality of different similarity measures are utilized in conjunction with execution of a query.

Figure 3:
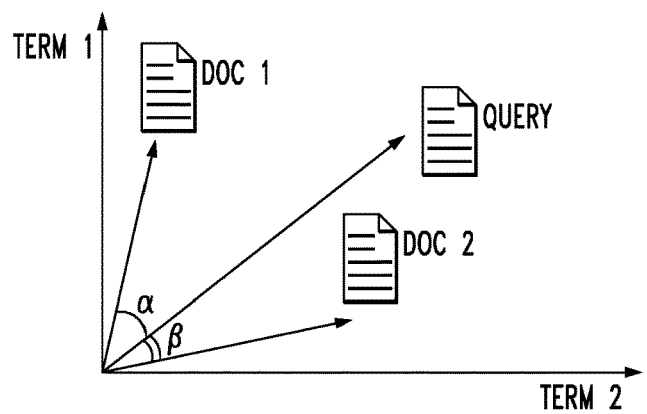
FIGS. 3 and 4 show different examples of similarity measures that are utilized in a data set discovery engine in an illustrative embodiment.

The frequency-based similarity measure may comprise, for example, a term frequency-inverse document frequency (TF-IDF) similarity measure. The use of an example TF-IDF similarity measure is illustrated in FIG. 3. The TF-IDF similarity measure is based on the notion of a "bag of words" comprising the most relevant terms extracted from a query document. The extracted terms are assigned numeric weights that serve as coordinates for the document in a vector space, in accordance with a vector space model (VSM). The weights are computed from normalized frequency of term occurrence, also referred to as TF-IDF quantities. Application of the measure is justified by the empirical observation that documents that are "close together" in this space tend to relate to the same topics. The TF-IDF quantities and the term weights are illustratively computed as follows:

tf(t,d)—number of times that term t occurs in a document d $$idf(t) = \log(N/df(t)), \text{ where } N\text{—number of documents in a collection}$$

df(t)—number of documents in a collection that contain term t $$w(t,d) = tf(t,d) \times idf(t)$$

w(t,d) is the weight assigned to the term t

These TF-IDF quantities and term weights are computed as part of the indexing process in the data set indexer 102. This computation is done for each term in the bag of words, so that a vector is obtained for each document. The TF-IDF degree of similarity of two documents can then be measured by a cosine between their respective vectors, as illustrated in FIG. 3. In this figure, a collection of documents includes documents denoted as Doc 1 and Doc 2. The bag of words includes two terms denoted Term 1 and Term 2. The similarity of a query document to Doc 1 is given by cos α, where α is the angle between the query document vector and the Doc 1 vector, and the similarity of the query document to Doc 2 is given by cos β, where β is the angle between the query document vector and the Doc 2 vector. In this case, Doc 2 is closer to the query document than Doc 1, because cos β<cos α.

It is to be appreciated that a wide variety of other types of frequency-based similarity measures may be used in a given embodiment, in addition to or in place of a TF-IDF similarity measure, including probabilistic similarity measures such as BM25.

Figure 4:
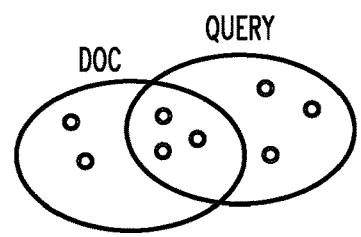

As noted above, the data set discovery engine of system 100 also supports at least one non-frequency-based similarity measure. One example of a non-frequency-based similarity measure comprises a Jaccard similarity measure, illustrated in FIG. 4. The Jaccard similarity measure computes the difference between two sets of data items, for instance, a set of terms or words from a document relative to a set of terms or words from a query, as the number of common elements of the two sets divided by the total number of distinct elements in the two sets. In the FIG. 4 example, a Jaccard similarity measure J(doc, query) is more particularly given by the count of the intersection of the set of terms or words in a document ("doc") with the set of terms or words in a query, divided by the count of the union of the set of terms or words in the document with the set of terms or words in the query. In the figure, the operator |•| denotes the count of the specified intersection ∩ or union ∪. As illustrated, the document includes five elements, the query includes six elements, and three of the elements are common to the document and the query, such that the Jaccard similarity measure is given by ⅜.

The Jaccard similarity measure computation may be performed approximately, using a random representative sampling of the two sets. Such an approximate computation is appropriate when the cardinalities of the sets are large, and may involve, for example, multiple applications of hash functions of a particular type ("MinHash") to elements of each of the sets. Other approaches use locality-sensitive hash (LSH) functions.

Again, the frequency-based and non-frequency-based similarity measures referred to above are examples only, and numerous other types of similarity measures can be used in other embodiments. The similarity measures in some embodiments are "pluggable" similarity measures in that functionality for supporting such measures can be provided to the data set indexer 102 via an API or other type of interface. Other arrangements for supporting one or more pluggable similarity measures can be used.

Accordingly, in some embodiments, the degree of similarity between a given pair of data sets is determined utilizing multiple similarity measures selected and weighted in an at least partially automated manner, possibly responsive to user input.

Figure 5:
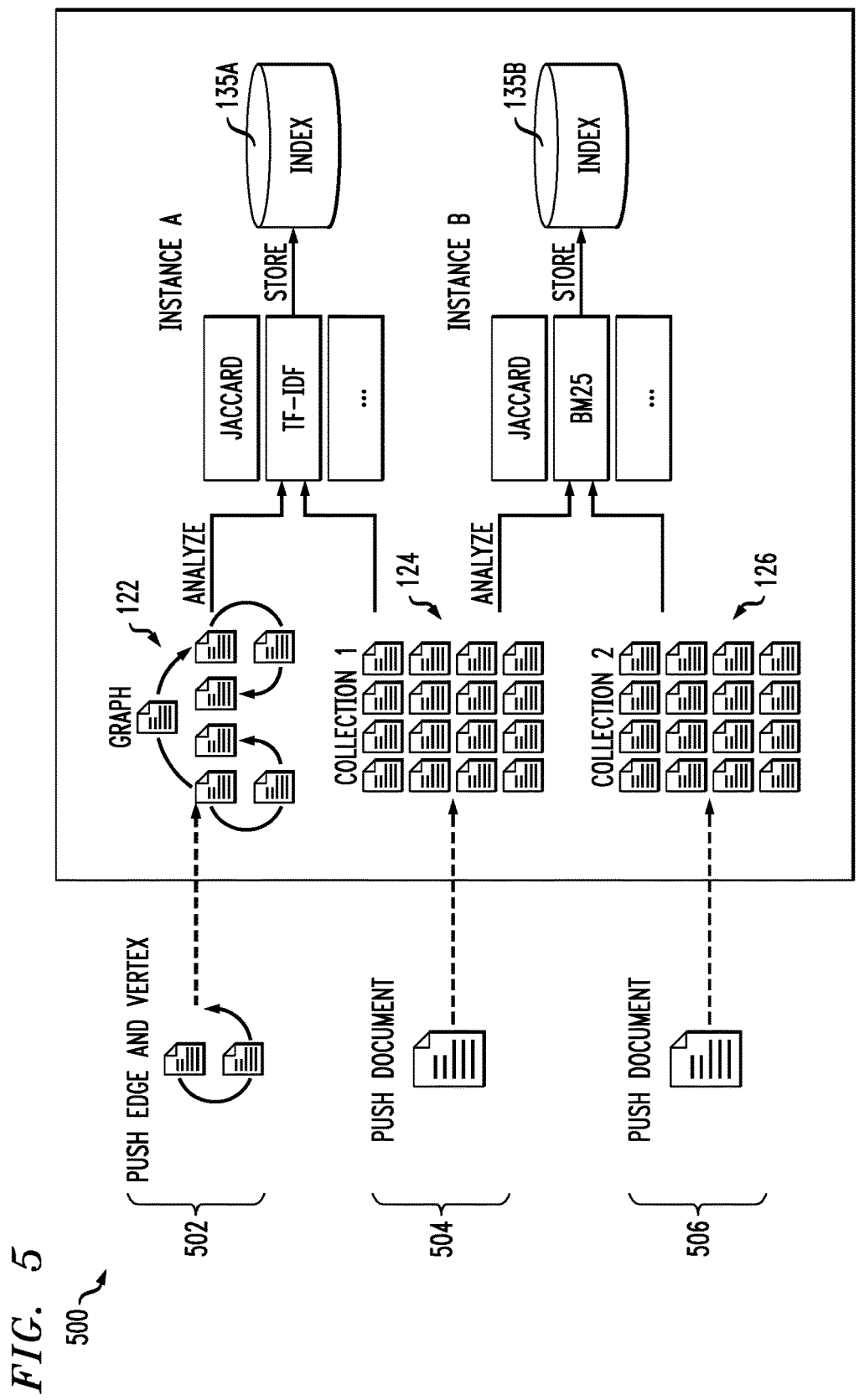
FIG. 5 shows examples of generation of similarity indexes each of which comprises auxiliary information generated from multiple distinct similarity measures in an illustrative embodiment.

Examples illustrating the generation of similarity indexes in step 200 using multiple distinct similarity measures are shown in FIG. 5. In this embodiment, a process 500 includes operations 502, 504 and 506 for providing respective portions of the graph 122, collection 124 and collection 126 of the system 100. The graph 122 in this embodiment comprises vertices that correspond to respective documents, and edges that represent respective relationships among the documents. The collections 124 and 126 are more particularly referred to as Collection 1 and Collection 2 in the figure. Each such collection in this embodiment is assumed to comprise a set of documents as shown. The operation 502 involves pushing an edge and vertex to the graph 122. Similarly, operations 504 and 506 involve pushing respective documents to the collections 124 and 126. The operations 502, 504 and 506 are assumed to be repeated for additional edges and vertices and additional documents within the process 500.

The process 500 further involves generating respective similarity indexes 135A and 135B which correspond to respective distinct instances of the similarity index 135 of FIG. 1. The associated operations are also referred to as Instance A and Instance B of the similarity index generation portion of process 500.

The similarity index 135A of Instance A is generated by analyzing the graph 122 and the collection 124. More particularly, at least portions of the graph 122 and the collection 124 are analyzed using multiple distinct similarity measures, including a Jaccard similarity measure, a TF-IDF similarity measure, and one or more additional similarity measures. Auxiliary information generated from respective ones of these similarity measures is stored as part of the similarity index 135A.

The similarity index 135B of Instance B is generated by analyzing the collections 124 and 126. More particularly, at least portions of the collections 124 and 126 are analyzed using multiple distinct similarity measures, including a Jaccard similarity measure, a BM25 similarity measure, and one or more additional similarity measures. Auxiliary information generated from respective ones of these similarity measures is stored as part of the similarity index 135B.

The generation of similarity indexes such as similarity indexes 135A and 135B each comprising auxiliary information generated from multiple distinct similarity measures facilitates fast discovery of relevant data sets within the system 100. The particular similarity measures used in generation of a given similarity index can be dynamically adjusted by provision of additional or alternative pluggable similarity measures.

The particular similarity index generation techniques illustrated in FIG. 5 are examples only, and should not be construed as limiting in any way. Numerous other techniques can be used, as well as different types and arrangements of data sets. For example, although the data sets in the FIG. 5 examples and other examples herein relate to documents, a wide variety of other data sets comprising alternative or alternative data items can be used.

Returning now to the example process of FIG. 2, the remaining steps 202 and 204 will now be described.

In step 202, a suitability template is obtained for a query. The query may be a query submitted to the query compiler 108 from the endpoint device 112, a query retrieved from the query cache 110, or another type of query. The suitability template is illustratively generated by the data set indexer 102 and characterizes suitability for at least one of a particular purpose, a particular goal and a particular analytic role. The suitability template may be associated with at least one target data set, for example, in an arrangement in which the data set indexer 102 is configured to generate similarity indexes for a plurality of target data sets each associated with one or more suitability templates. It is also possible that at least a portion of the suitability template may be part of the query itself.

The processing in steps 200 and 202 in some embodiments is aligned with a predetermined semantic hierarchy of data items and relationships. For example, such a semantic hierarchy may be as follows:

Data sets→metadata→relationships→similarity→suitability

In this example, the elements of the semantic hierarchy are arranged from a lowest level to a highest level, with the data sets being at the lowest level and the suitability being at the highest level. Other types of semantic hierarchies can be used in other embodiments.

An advantage of utilizing an explicit semantic hierarchy as part of the FIG. 2 process is that such an arrangement allows higher-level semantic considerations to be applied to searching for and retrieving data sets, thereby potentially providing more accurate results from the user's point of view.

A more detailed example of another semantic hierarchy is shown in the Appendix. In the Appendix, the example semantic hierarchy is arranged in decreasing order of level, from suitability at the highest level of the hierarchy to data set content at the lowest level. Multiple use cases are listed for each of the different levels of the semantic hierarchy in this example. It is to be appreciated that the various use cases, levels and other aspects of the semantic hierarchy shown in the Appendix are presented by way of illustrative example only and should not be considered limiting in any way.

As mentioned previously, data set suitability illustratively indicates suitability for a particular purpose, goal or analytic role. Suitability can be determined in some embodiments by first defining a data set template relevant for the given purpose, goal or analytic role. This may involve, for example, selecting a set of keywords in a target document, and assigning weights to the keywords based on their relative importance. Data sets can then be discovered and ranked according to their similarity to the template. For example, documents containing more of the specified keywords with higher weights are considered more suitable for the given purpose, goal or analytic role. Suitability may depend partly on data set metadata such as creation date, size, owner, security classification, content tags, as well as relationships with other data sets. Additionally or alternatively, various higher order relationships, also referred to herein as relationships among relationships, can be considered for determining suitability, as will be described in more detail below.

The suitability template in some embodiments is created from user-defined rules reflecting the purpose, goal or analytic role of required data sets. This may include, for example, identification of one or more appropriate training data sets. The suitability template can illustratively be viewed as a relativistic representation of one or more data sets. Such a suitability template can be utilized in conjunction with scoring and ranking of data sets, but can also be applied to historical targets. For example, a suitability template can be used not only to identify a path from a target data set A to one or more suitable data sets, but also a path from target data set A to similar target data sets B and C, and thereby to potentially suitable data sets associated with the target data sets B and C. Accordingly, a suitability template can support not only data set clustering but also target clustering, so as to allow navigation to be sequenced and mixed over both types of clustering.

Suitability templates in some embodiments are configured to enable discovery of data sets that may need to be restricted due to regulatory or compliance issues. For example, data sets may need to be restricted because they contain personal identification information (PII) or personal health information (PHI). Discovery of such data sets can be achieved using direct, derived and higher-order relationships along with similarity values. As a more particular example, a data set DS1 containing PII may be combined with one or more other data sets during an analysis process, producing a new data set DS2 that may be similar to the original DS1 by some similarity measures. It is very useful to know that DS2 is similar to DS1, since DS2 could then be restricted. The suitability aspect in this example, built on the underlying discovery of similarity of DS2 to DS1, is "suitability for tagging as sensitive content," which may lead to further restrictions on DS2 access and dissemination.

In step 204, the query is executed against one or more of the similarity indexes based at least in part on the suitability template. For example, the relativistic retriever 104 may be configured to retrieve particular ones of the data sets in conjunction with execution of the query and to order the retrieved data sets in terms of their respective degrees of similarity to a given target data set associated with the suitability template. Again, references herein to retrieval of a given data set are intended to be broadly construed, and should not be viewed as requiring, for example, reading of the data set from a memory or other storage device. For example, a data set may be "retrieved" as that term is broadly used herein by providing a pointer to the data set or by providing other types of information sufficient to allow the data set to be read from a memory or other storage device.

Additionally or alternatively, the relativistic retriever 104 may be configured to identify relationships among retrieved data sets, as well as relationships among those relationships, in conjunction with execution of the query.

The relativistic retriever 104 in some embodiments is also illustratively configured to permit a user to navigate the retrieved data sets in accordance with the identified relationships and one or more additional relationships. These one or more additional relationships can include, for example, other relationships among the retrieved data sets and other data sets, or other relationships that the other data sets participate in, as well as various combinations of these and other relationships.

Such arrangements advantageously facilitate and augment user reasoning over relationships, as well as identification of similarities and other correlations among relationships based on their descriptions.

The identified relationships are illustratively determined at least in part based on similarity of a target data set associated with the suitability template to one or more other target data sets associated with one or more other suitability templates.

The suitability template may be used in some embodiments to determine one or more of the similarity measures. For example, in some embodiments, at least one of the first and second similarity measures used to generate respective first and second auxiliary information referred to in the context of step 200 above is automatically selected based at least in part on the suitability template.

The first and second similarity measures in some embodiments have respective first and second weights assigned thereto. Such assigned weights are taken into account by the relativistic retriever 104 in recommending in conjunction with execution of the query one or more of the data sets that exhibit a specified degree of similarity to at least one target data set associated with the suitability template.

At least one of the similarity measures and at least one of the weights assigned to the respective similarity measures are adjusted over time based at least in part on user selection of particular data sets recommended by the relativistic retriever 104. A variety of additional or alternative types of user interaction with recommended data sets, such as user evaluation of one or more of the recommended data sets, can be used to control adjustments in one or more of the weights.

Such adjustments illustratively utilize one or more machine learning tools implemented within the system 100. For example, machine learning functionality may be implemented in the system 100 utilizing a machine learning tool such as Apache Spark™. Machine learning in some embodiments utilizes principal component analysis, clustering or other types of analysis of discovered data sets. Such machine learning can be implemented internally or externally relative to the data set discovery engine comprising data set indexer 102 and relativistic retriever 104.

The relativistic retriever 104 in some embodiments is configured to utilize query-based filtering of data set collections with the aid of corresponding similarity indexes. In such an arrangement, the relativistic retriever 104 can perform comparisons by relevant similarity measures utilizing only those portions of a data set collection that remain after the filtering operation, thereby avoiding potentially prohibitive computational costs associated with exhaustive lookup of the entire collection.

The relativistic retriever 104 in some embodiments is configured to propagate a tag, a classification or another type of information from one of the data sets to another one of the data sets in conjunction with the execution of the query. The suitability template is illustratively a source for at least a portion of the tag, classification or other type of information propagated from one data set to another.

Accordingly, some embodiments are configured to support propagation of arbitrary tags and classifications from a data set to similar data sets. Examples are "contains PIP" and "must remain in country of origin" and "potentially relevant to investigation XYZ." Also, if target data sets associated with suitability templates are tagged or classified, then the tags and classifications may be propagated to "suitable" data sets.

As indicated above, the FIG. 2 process can include additional steps not explicitly shown, such as retrieving particular ones of the data sets in conjunction with execution of the query, identifying relationships among the retrieved data sets and relationships among those relationships, and permitting a user to navigate the retrieved data sets in accordance with the identified relationships and one or more additional relationships.

The particular processing operations and other system functionality described in conjunction with the flow diagram of FIG. 2 are presented by way of illustrative example only, and should not be construed as limiting the scope of the invention in any way. Alternative embodiments can use other types of processing operations for data set indexing and associated relativistic retrieval of data sets. For example, the ordering of the process steps may be varied in other embodiments, or certain steps may be performed at least in part concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

The example process illustrated in the flow diagram FIG. 2 may be implemented in some embodiments in the form of a multi-stage workflow process. As a more particular example, a multi-stage workflow process for data set discovery using data set indexing and associated relativistic retrieval illustratively includes the following stages:

1. Data Preparation: Select one or more initial data set collections. Other data sets may be added incrementally later in the process.

2. Measure Preparation: Select initial similarity measures and their respective weights. Other similarity measures may be added incrementally later in the process, and the weights may be adjusted either manually or automatically.

3. Indexing: Index the data sets in the data collection, identify data set relationships, and compute auxiliary information. The auxiliary information is computed and stored in the index. Each instance of such auxiliary information is specific to a particular similarity measure. For example, first and second auxiliary information generated from respective first and second different similarity measures may be stored in the index. Descriptions of the relationships are also stored in the index.

4. Targeting: Formulate one or more suitability templates each associated with one or more target data sets. Data set content, rich metadata, interrelationships, and higher order relationships can be included in the suitability template. A suitability template illustratively provides a relativistic representation of suitable data sets.

5. Discovery: Query the data collection index to retrieve data sets similar to the one or more target data sets, which will be suitable to the intended purpose, goal or analytic role, as well as relationships among these data sets and relationships among the relationships. The query itself may comprise or otherwise identify one or more target data sets. Using the similarity index, filtering is performed in order to eliminate from consideration all data sets that are definitely not relevant to the query (e.g., those containing none of the relevant terms from the query). The remaining data sets are then processed using the similarity measures, and the results are ranked according to the obtained scores. The results are presented to the user in the descending order of degree of similarity to the suitability template. All the identified relationships between the relevant data sets may be simultaneously retrieved, possibly supplemented by higher-order relationships, also referred to herein as relationships among relationships. It should be noted that such higher-order relationships can include connections across multiple distinct hierarchical levels of relationships in some embodiments. Thus, for example, a relationship in one level of such a hierarchy can have a relationship to another relationship in the same level of the hierarchy, to another relationship in a different level of the hierarchy, and/or to an associated data set.

6. Exploration: Visualize and navigate the recommended data sets via interrelationships to gain understanding of their semantics and make a choice of data sets to use.

7. Optimization: Tune selection of similarity measures and relative weights based on feedback from user choices of recommended data sets.

It is to be appreciated that this is an example of one possible multi-stage workflow process, and numerous alternative arrangements of stages and processing operations may be used in other embodiments.

Additional aspects of illustrative embodiments will now be described with reference to FIGS. 6 through 9. The data sets in these embodiments are assumed to comprise documents, although it is to be appreciated that numerous other types and arrangements of data sets may be used in other embodiments.

Figure 6:
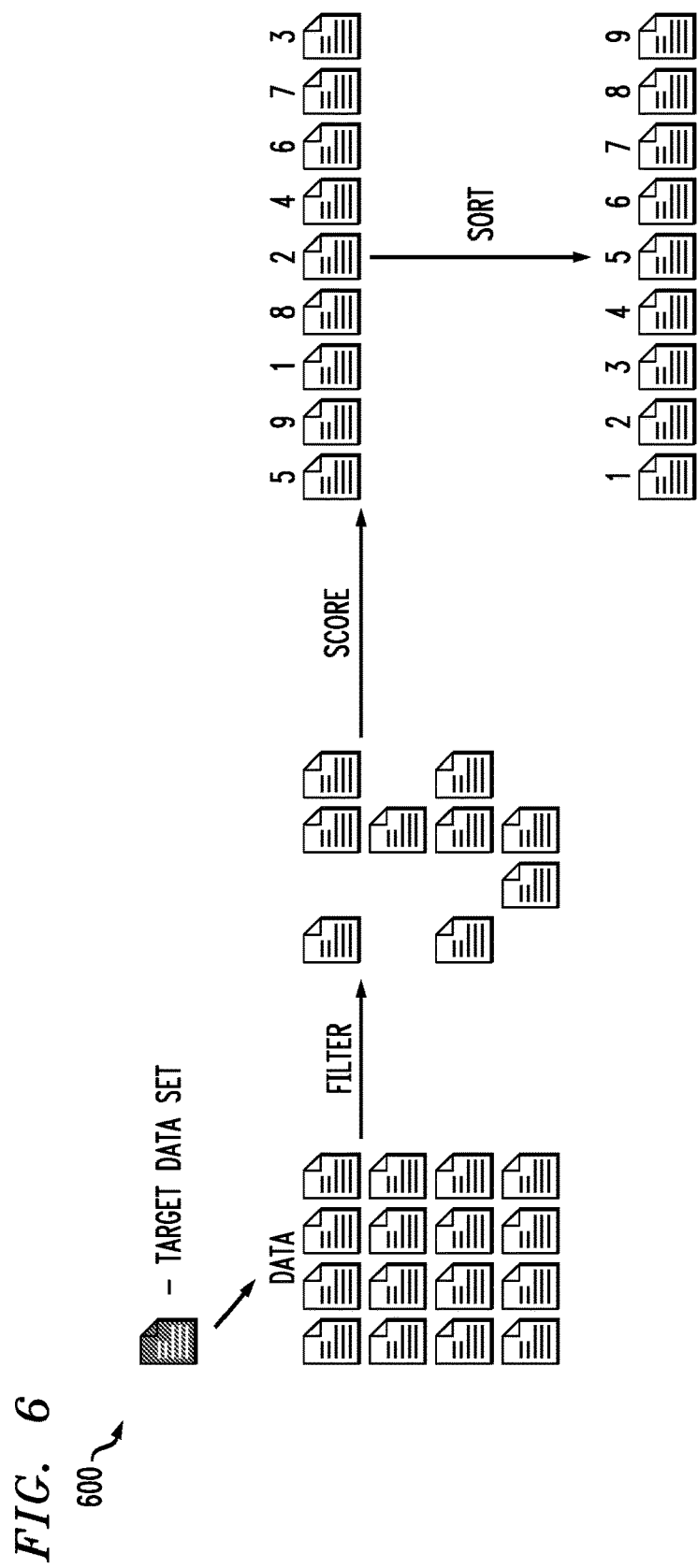
FIGS. 6 through 9 show additional examples of data set processing in a data set discovery engine in illustrative embodiments.

Referring now to FIG. 6, an example of a portion 600 of a data set discovery workflow in an illustrative embodiment is shown. A suitability template associated with a target data set is obtained. Data sets of a data collection are filtered, and the remaining data sets are scored in accordance with multiple similarity measures of a similarity index. The scored data sets are then sorted and ranked by degree of similarity to the target data set. The sorted and ranked data sets are presented as a search result in descending order of similarity.

Figure 7:
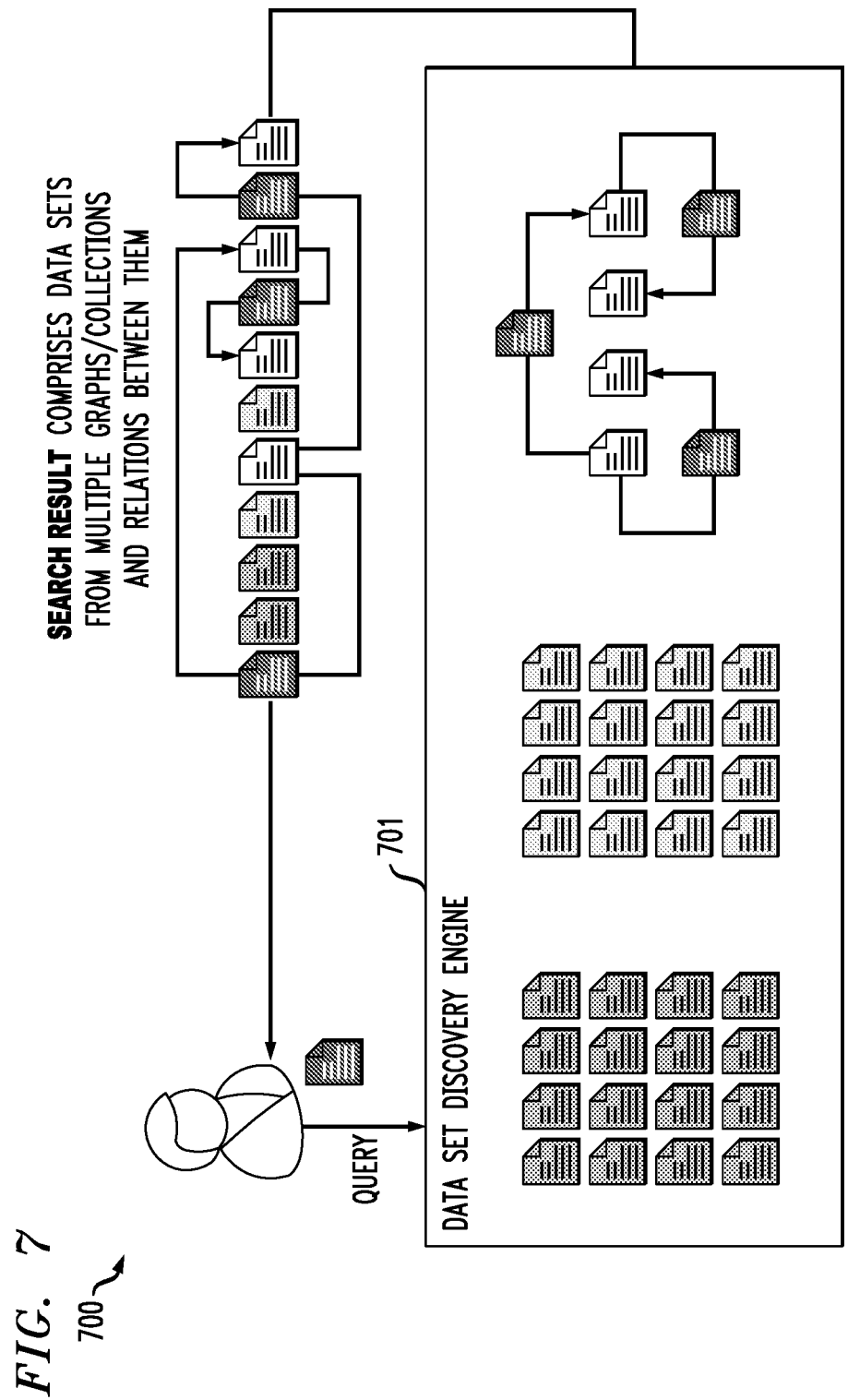

FIG. 7 shows an information processing system 700 that includes a data set discovery engine 701. The data set discovery engine 701 is assumed to incorporate a data set indexer and associated relativistic retriever similar to corresponding elements 102 and 104 of the FIG. 1 embodiment. The data set discovery engine 701 is configured to provide federated retrieval of data sets similar to a target data set associated with a query. The retrieval is federated in this example in that it retrieves suitable data sets across multiple potentially unrelated data collections and one or more graphs. The search result provided in this embodiment comprises data sets from multiple data collections and one or more graphs as well as relationships between these data sets. Although not illustrated in the figure, higher-order relationships can also be provided as part of the search result.

Figure 8:
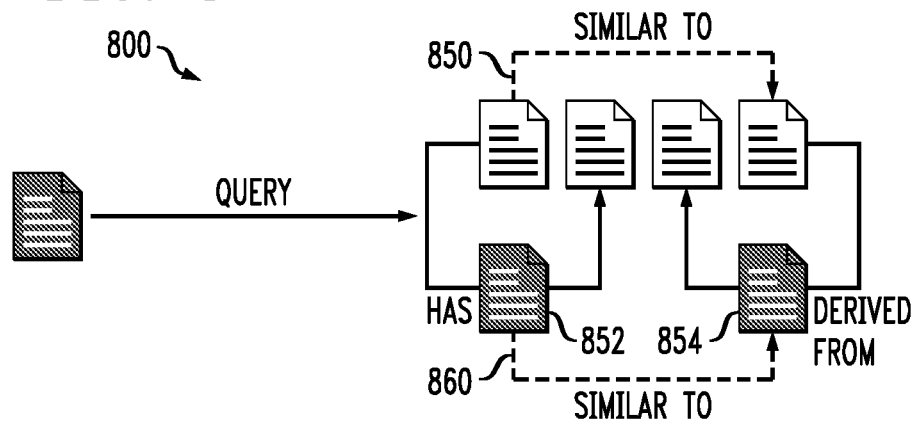

Such an arrangement involving higher-order relationships is illustrated in FIG. 8. In this figure, a portion 800 of a data set discovery workflow identifies a target data set associated with a query and processes the query in order to obtain a search result that includes multiple data sets including an indication of a query-dependent relationship 850 ("Similar to") between a pair of the data sets. The search result in this embodiment further comprises relationships 852 ("Has") and 854 ("Derived from") among respective pairs of the data sets. In addition, the search result comprises a higher-order relationship in the form of a relationship 860 ("Similar to") among the relationships 852 and 854.

Figure 9:
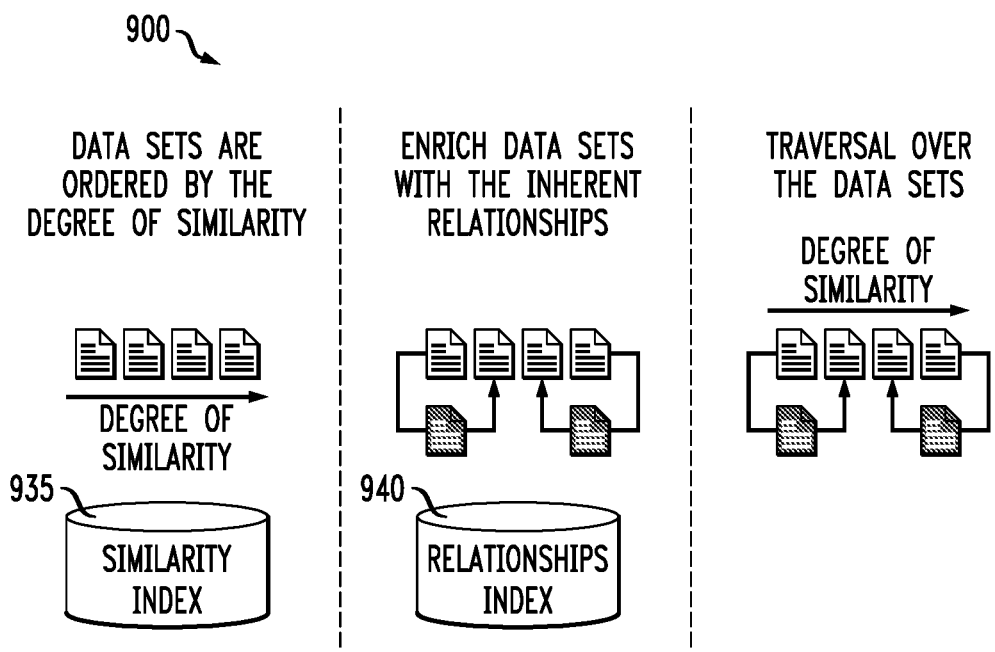

FIG. 9 shows a portion 900 of another exemplary data set discovery workflow in an illustrative embodiment. In this embodiment, discovered data sets are ordered by degree of similarity utilizing a similarity index 935. The ordered data sets are then enriched with relationships among the data sets utilizing a relationships index 940. The data sets and the identified relationships can then be traversed in order of degree of similarity as illustrated in the figure. The relationships index 940 in some implementations of the FIG. 9 embodiment is incorporated into the similarity index 935.

The features and functionality of the illustrative embodiments of FIGS. 6 through 9 are presented by way of example, and should not be construed as limiting in any way.

Embodiments of the invention can be adapted for utilization in a wide variety of different information processing contexts, including health care, bioinformatics, financial services, telecommunications, and other contexts characterized by the need for accurate, efficient and deep data set discovery functionality.

Figure 10:
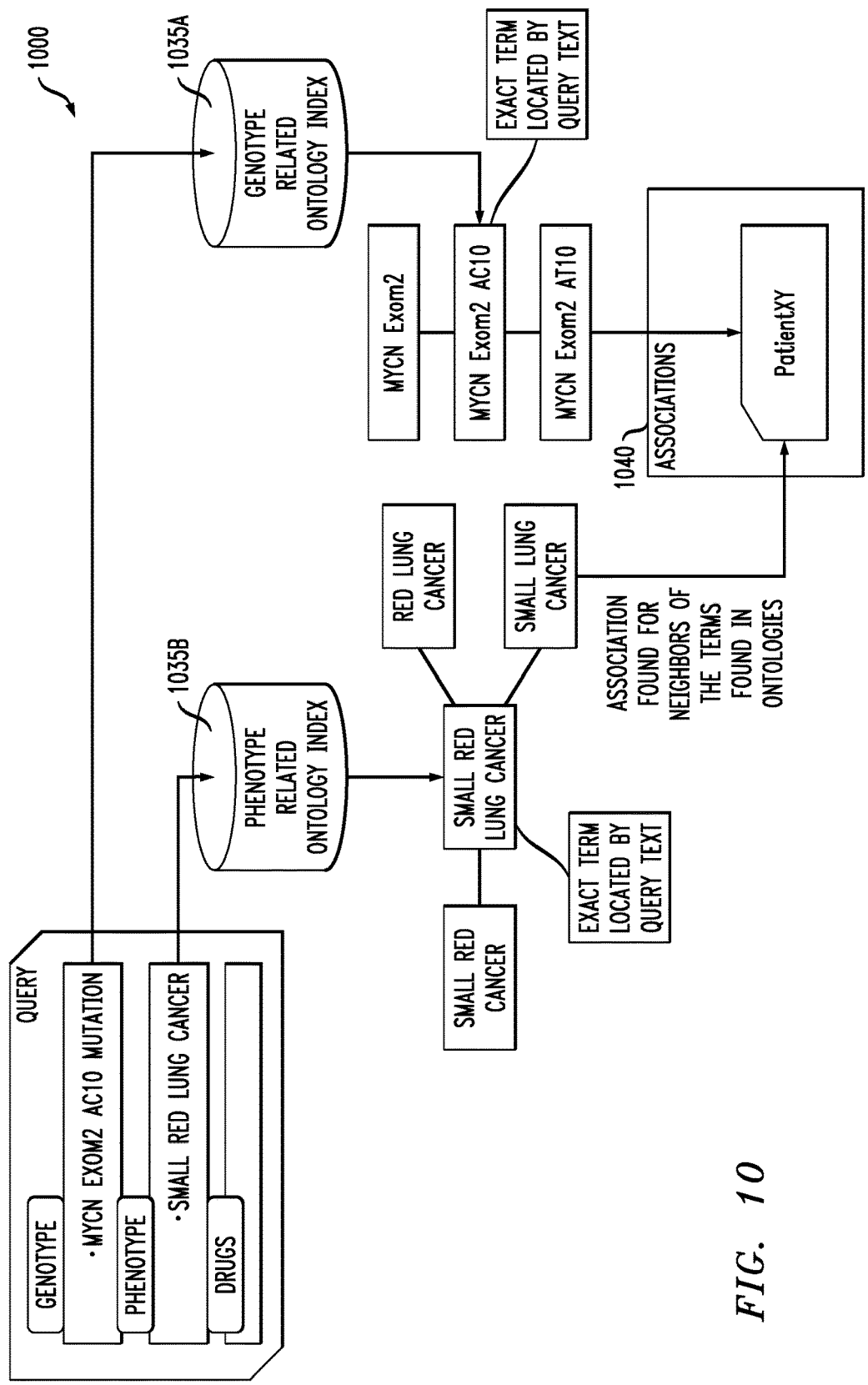
FIG. 10 shows an example use case of a data set discovery engine in an illustrative embodiment.

An example use case in the context of health care will now be described in more detail in conjunction with FIG. 10. This embodiment supports similarity-based queries in various health care applications such as discovery and navigation of genotype-phenotype associations described in terms of domain-specific ontologies. More particularly, an information processing system 1000 as shown in FIG. 10 processes a query that includes a genomic condition and a phenotypic condition.

The system 1000 is assumed to comprise a data set discovery engine incorporating a data set indexer and associated relativistic retriever similar to corresponding elements 102 and 104 of the FIG. 1 embodiment. The data set indexer generates a genotype related ontology index 1035A and a phenotype related ontology index 1035B. The relativistic retriever utilizes the indexes 1035A and 1035B in processing the query. More particularly, data sets and relationships between the data sets are determined and processed to generate a search result in the form of one or more associations 1040.

The one or more associations 1040 in this embodiment illustratively include a detected relationship among a data set from a genotype related data set collection, a data set from a phenotype related data set collection, and a particular data set ("PatientXY") of a third data collection that includes patient records. The discovered association in this example is a common link between the two ontologies, in the form of an association found for neighboring terms of the respective genotypic and phenotypic condition terms located by query text in respective graphs characterized by the indexes 1035A and 1035B. The ontologies are potentially very large collections of relatively small documents each defining a condition, genotypic or phenotypic, with many relationships among their respective data sets.

Again, the above health care example and its associated functionality should not be viewed as limiting in any way. Numerous other embodiments utilizing data set indexing and associated relativistic retrieval will be apparent to those skilled in the art given the teachings provided herein. For example, other embodiments can be configured in which data set discovery through indexing and relativistic retrieval is implemented in other contexts, and using alternative arrangements of modules and components.

Alternative use cases for illustrative embodiments include classical text-based federated information retrieval on document collections, metadata-based suitability recommendations on collections of database tables, relationship discovery in social network analysis (SNA) contexts, and processing of source data files for predictive modeling of customer behavior in enterprise applications.

Illustrative embodiments are configured to provide a number of significant advantages relative to conventional arrangements.

For example, one or more of these embodiments implement a scalable indexer combined with API-pluggable similarity measures, configured to facilitate fast similarity-based retrieval and ranking of data sets. Such an embodiment treats data sets and relationships among them uniformly, thus allowing it to identify similarities between the retrieved data sets, and similarities and other relationships among relationships. It supports suitability-based data set recommendation by creating a suitability template relevant for given purpose, goal or analytic role, and utilizing multiple similarity measures in conjunction with this template for retrieval and ranking suitable data sets. Data set discovery can be implemented in a given one of these embodiments utilizing a broad spectrum of user-selected, user-defined or user-provided domain-specific similarity measures, including both frequency-based and non-frequency-based similarity measures in various combinations. Capabilities for exploration, visualization and navigation by data set relationships and higher order relationships are provided. For example, discovery of data sets that may need to be restricted due to regulatory or compliance issues can be achieved using direct and derived relationships.

Some embodiments are configured to permit usage of arbitrary appropriate similarity measures for simultaneous federated retrieval of both data sets and relationships among them, as well as higher order relationships, ranked by relevance according to the similarity measures or their combination.

In one or more embodiments, usage of arbitrary similarity measures, appropriate for scoring of any aspect of similarity of any data set in a collection to a target data set, provides nuanced and tunable similarity functionality. Unlike conventional approaches, illustrative embodiments can utilize arbitrary combinations of narrow or complementary similarity measures, such that no single measure bears the entire burden of similarity scoring. The selection of similarity measures in some embodiments is automated based on aspects of the suitability template. For example, similarity measures can be progressively refined. In some embodiments, this may involve adding more similarity measures incrementally given a suitability template until the resulting set of suitable data sets is sufficiently stable.

Another advantage of one or more embodiments is that a given such embodiment is configured to leverage history and user acceptance of suitability-based data set recommendations to optimize, adjust, tune and reinforce similarity measure choices and weightings. Such functionality can be implemented via internal or external machine learning and related principal component analysis, clustering or other types of analysis.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 11:
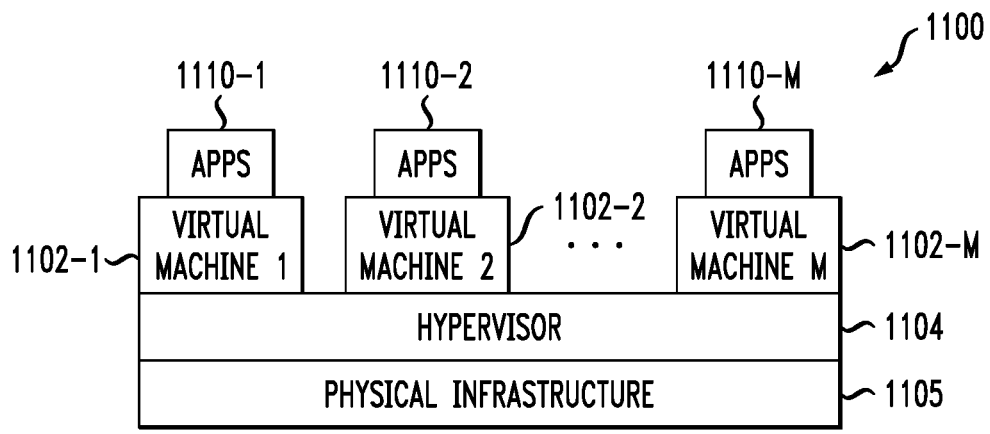
FIGS. 11 and 12 show examples of processing platforms that may be utilized to implement at least a portion of a data set discovery engine in illustrative embodiments.
Figure 12:
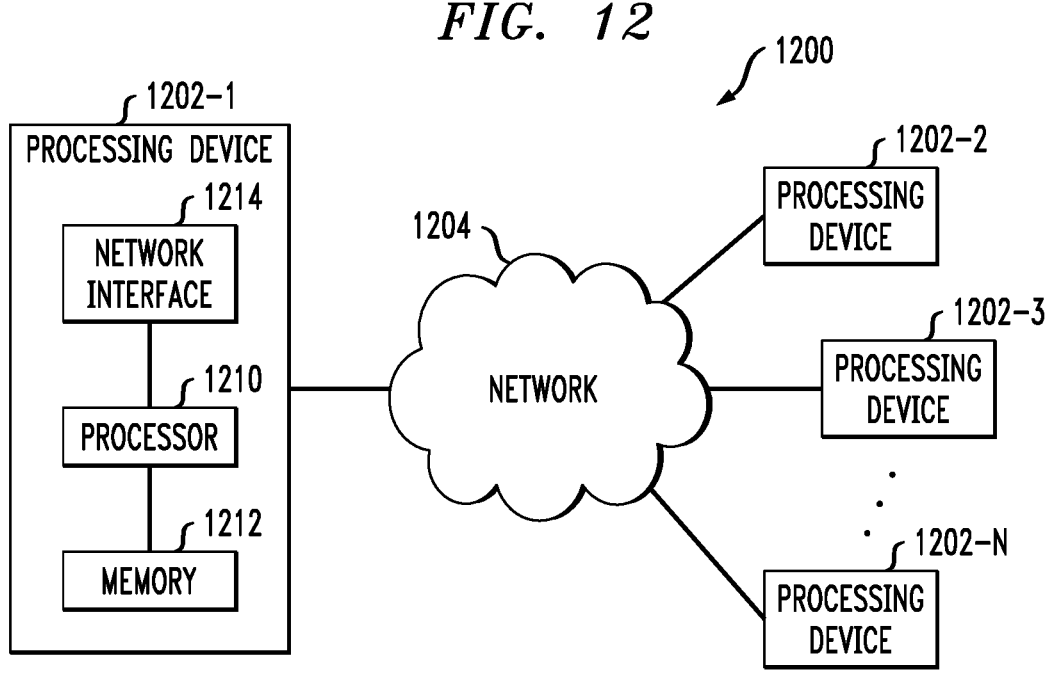

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises virtual machines (VMs) 1102-1, 1102-2, . . . 1102-M implemented using a hypervisor 1104. The hypervisor 1104 runs on physical infrastructure 1105. The cloud infrastructure 1100 further comprises sets of applications 1110-1, 1110-2, . . . 1110-M running on respective ones of the virtual machines 1102-1, 1102-2, . . . 1102-M under the control of the hypervisor 1104.

Although only a single hypervisor 1104 is shown in the embodiment of FIG. 11, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1104 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

It is also possible that portions of system 100 can be implemented at least in part using converged infrastructure, such as Vblock® converged infrastructure commercially available from EMC Corporation.

One or more of the processing modules or other components of system 100 may therefore each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-N, which communicate with one another over a network 1204.

The network 1204 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, such as container-based virtualization infrastructure using Docker containers or other types of Linux containers (LXCs), in place of or in addition to virtualization infrastructure comprising virtual machines.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide accurate, efficient and deep data set discovery functionality. Also, the particular configurations of system and device elements shown in the figures can be varied in other embodiments. Thus, for example, the particular type of indexing and retrieval modules deployed in a given embodiment and their respective configurations may be varied. Other features of the illustrative embodiments such as similarity indexes and suitability templates can also be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

APPENDIX: EXAMPLE SEMANTIC HIERARCHY

| Object/Concept | Use Cases |
|---|---|
| Suitability of Data Sets for a Purpose (or for a User) | Describe Purpose as a "Target Data Set Template" (may be for a Given Data Set Role in a Given Process) Define Suitability Rules for a Purpose (including Constraints) (needs and boundaries of use) Profile User (including Interests Old and New, Entitlements ,Data Set Usage History and Ratings, Colleagues) Assess Data Set Suitability for Future Purpose by Using Similarity to Target Data Set and by Applying Suitability Rules (Network of datasets and its usage) Assess Data Set Suitability for Prior Purpose (Forensics) Assess Data Set Suitability for User Based on User Profile, Data Set Attributes, Similarities, Relationships, Usage Trends Recommend Data Set for Purpose Recommend Data Set for User Recommend Data Set for User and Purpose |
| Similarity of Data Sets | Define Similarity Metrics and Weightings Based on Metadata and Content Find Similar Data Sets (and Add Similarity Relationships among Them) Assess Similarity of Two Data Sets Cluster Data Sets by Similarity |
| Relationships among Data Sets | Capture Relationships and Lineage (or Infer Them), such as DerivedFrom, InputTo, PartOf, CopyOf, VersionOf Navigate to Related Data Sets Find Right Data Set from Related Data Sets (e.g., Right Version) |
| Metadata on Data Sets | Add Metadata (Type, Source, Structure, Description, Date, Owner, Security, Access Heat, many other Tags and Classifications) Index Metadata Search on Metadata and Content (may use Domain-Specific Vocabulary) Route or Alert Based on Metadata and Content Place or Move or Copy or Restore Data Sets Based on Metadata |
| Content in Data Sets | Read or Write Data Set Copy or Move Data Set Index Content, Search Content |

What is claimed is:

1. An apparatus comprising:
a processing platform implementing a data set discovery engine;
wherein the data set discovery engine comprises:
a data set indexer configured to generate similarity indexes for a plurality of data sets each comprising a plurality of data items; and
a relativistic retriever coupled to the data set indexer and configured to obtain a suitability template for a query and to execute the query against one or more of the similarity indexes based at least in part on the suitability template;
the suitability template limiting usage of particular ones of the data sets to particular data set discovery contexts;
wherein a given one of the similarity indexes comprises, in addition to indexing information characterizing data items of its corresponding one or more data sets, at least first and second auxiliary information generated from respective ones of at least first and second different similarity measures of a plurality of different similarity measures supported by the data set discovery engine;
the first auxiliary information being computed from the data items of the corresponding one or more data sets using the first similarity measure;
the second auxiliary information being computed from the data items of the corresponding one or more data sets using the second similarity measure; and
wherein the processing platform comprises one or more processing devices each comprising a processor coupled to a memory.

2. The apparatus of claim 1 wherein the plurality of different similarity measures supported by the data set discovery engine comprise at least one frequency-based similarity measure and at least one non-frequency-based similarity measure, and wherein an arbitrary set of two or more similarity measures selected from the plurality of different similarity measures are utilized in conjunction with execution of the query.

3. The apparatus of claim 2 wherein said at least one frequency-based similarity measure comprises at least one of a term frequency-inverse document frequency (TF-IDF) similarity measure and a probabilistic similarity measure, and wherein said at least one non-frequency-based similarity measure comprises a Jaccard similarity measure.

4. The apparatus of claim 1 wherein the suitability template is part of the query.

5. The apparatus of claim 1 wherein at least one of the first and second similarity measures is automatically selected based at least in part on the suitability template.

6. The apparatus of claim 1 wherein functionality for generating at least one of the first and second similarity measures is provided to the data set discovery engine on a pluggable basis via an application programming interface.

7. The apparatus of claim 1 wherein the suitability template characterizes suitability for at least one of a particular purpose, a particular goal and a particular analytic role.

8. The apparatus of claim 1 wherein the suitability template is associated with at least one target data set and further wherein the data set indexer is configured to generate similarity indexes for a plurality of target data sets each associated with one or more suitability templates.

9. The apparatus of claim 1 wherein the first and second similarity measures have respective first and second weights assigned thereto and wherein said assigned weights are taken into account by the relativistic retriever in recommending in conjunction with execution of the query one or more of the plurality of data sets that exhibit a specified degree of similarity to at least one target data set associated with the suitability template.

10. The apparatus of claim 9 wherein at least one of the similarity measures and at least one of the weights assigned to the respective similarity measures are adjusted over time through machine learning based at least in part on user interaction with particular data sets recommended by the relativistic retriever, said user interaction comprising at least one of user selection of one or more of the recommended data sets and user evaluation of one or more of the recommended data sets.

11. The apparatus of claim 1 wherein the relativistic retriever is configured to retrieve particular ones of the data sets in conjunction with execution of the query and to order the retrieved data sets in terms of their respective degrees of similarity to a given target data set associated with the suitability template.

12. The apparatus of claim 1 wherein the relativistic retriever is configured to identify in conjunction with execution of the query one or more of:
   (i) relationships among retrieved data sets; and
   (ii) relationships among the relationships in (i).

13. The apparatus of claim 12 wherein the relativistic retriever is configured to permit a user to navigate the retrieved data sets in accordance with the identified relationships and one or more additional relationships, the one or more additional relationships comprising at least one relationship selected from:
   (i) other relationships among the retrieved data sets and other data sets; and
   (ii) other relationships that the other data sets participate in.

14. The apparatus of claim 12 wherein the identified relationships are determined at least in part based on one or more of:
   (i) similarity of a target data set associated with the suitability template to one or more other target data sets associated with one or more other suitability templates; and
   (ii) one or more semantic considerations derived from a semantic hierarchy of data sets and relationships.

15. The apparatus of claim 1 wherein the relativistic retriever is configured to propagate at least one of a tag and a classification from one of the data sets to another one of the data sets in conjunction with the execution of the query.

16. The apparatus of claim 15 wherein the suitability template is a source for at least a portion of at least one of the tag and the classification.

17. A method comprising:
   generating similarity indexes for a plurality of data sets each comprising a plurality of data items;
   obtaining a suitability template for a query; and
   executing the query against one or more of the similarity indexes based at least in part on the suitability template;
   the suitability template limiting usage of particular ones of the data sets to particular data set discovery contexts;
   wherein a given one of the similarity indexes comprises, in addition to indexing information characterizing data items of its corresponding one or more data sets, at least first and second auxiliary information generated from respective ones of at least first and second different similarity measures of a plurality of different similarity measures;
   the first auxiliary information being computed from the data items of the corresponding one or more data sets using the first similarity measure;
   the second auxiliary information being computed from the data items of the corresponding one or more data sets using the second similarity measure; and
   wherein the generating, obtaining and executing are performed by a processing platform comprising one or more processing devices.

18. The method of claim 17 further comprising:
   retrieving particular ones of the data sets in conjunction with execution of the query;
   identifying one or more of:
      (i) relationships among the retrieved data sets; and
      (ii) relationships among the relationships in (i); and
   permitting a user to navigate the retrieved data sets in accordance with the identified relationships and one or more additional relationships.

19. A computer program product comprising a non-transitory processor-readable storage medium having one or more software programs embodied therein, wherein the one or more software programs when executed by at least one processing device of a processing platform cause the processing device:
   to generate similarity indexes for a plurality of data sets each comprising a plurality of data items;
   to obtain a suitability template for a query; and
   to execute the query against one or more of the similarity indexes based at least in part on the suitability template;
   the suitability template limiting usage of particular ones of the data sets to particular data set discovery contexts;
   wherein a given one of the similarity indexes comprises, in addition to indexing information characterizing data items of its corresponding one or more data sets, at least first and second auxiliary information generated from respective ones of at least first and second different similarity measures of a plurality of different similarity measures;
   the first auxiliary information being computed from the data items of the corresponding one or more data sets using the first similarity measure;
   the second auxiliary information being computed from the data items of the corresponding one or more data sets using the second similarity measure.

20. The computer program product of claim 19 wherein the one or more software programs when executed by at least one processing device of the processing platform further cause the processing device:
   to retrieve particular ones of the data sets in conjunction with execution of the query;
   to identify one or more of:
      (i) relationships among the retrieved data sets; and
      (ii) relationships among the relationships in (i); and
   to permit a user to navigate the retrieved data sets in accordance with the identified relationships and one or more additional relationships.

* * * * *